United States Patent
Abhyankar et al.

(10) Patent No.: US 12,147,387 B2
(45) Date of Patent: Nov. 19, 2024

(54) SYSTEM AND METHOD FOR REGULAR UPDATES TO COMPUTER-FORM FILES

(71) Applicant: Citigroup Technology, Inc., New York, NY (US)

(72) Inventors: Yogesh Abhyankar, Kilchberg (CH); Manojkumar Mahantappa Paragond, Glattbrugg (CH)

(73) Assignee: CITIGROUP TECHNOLOGY, INC., New York, NY (US)

( * ) Notice: Subject to any disclaimer, the term of this patent is extended or adjusted under 35 U.S.C. 154(b) by 0 days.

(21) Appl. No.: 18/238,992

(22) Filed: Aug. 28, 2023

(65) Prior Publication Data
US 2024/0248877 A1 Jul. 25, 2024

Related U.S. Application Data

(63) Continuation of application No. 18/099,824, filed on Jan. 20, 2023, now Pat. No. 11,768,806.

(51) Int. Cl.
*G06F 16/00* (2019.01)
*G06F 16/16* (2019.01)
*G06F 16/17* (2019.01)

(52) U.S. Cl.
CPC .......... *G06F 16/16* (2019.01); *G06F 16/1734* (2019.01)

(58) Field of Classification Search
CPC ....... G06F 16/16; G06F 17/16; G06F 16/1734
USPC ....................................................... 707/690
See application file for complete search history.

(56) References Cited

U.S. PATENT DOCUMENTS

| | | | |
|---|---|---|---|
| 7,028,252 B1 | 4/2006 | Baru et al. | |
| 10,133,812 B2 * | 11/2018 | Lee | G06F 16/335 707/707 |
| 10,235,721 B1 * | 3/2019 | Cabrera | G06Q 40/123 707/707 |
| 2011/0302167 A1 | 12/2011 | Vailaya et al. | |
| 2016/0217534 A1 | 7/2016 | Goldman et al. | |
| 2017/0004518 A1 | 1/2017 | Moreau, Jr. | |
| 2020/0013036 A1 | 1/2020 | Griffith | |
| 2020/0184267 A1 | 6/2020 | Kumar | |
| 2022/0318929 A1 | 10/2022 | Tavares et al. | |

(Continued)

OTHER PUBLICATIONS

International Search Report and Written Opinion on PCT App. PCT/US2024/011149 dated Mar. 4, 2024 (7 pages).

*Primary Examiner* — Alexandria Y Bromell
(74) *Attorney, Agent, or Firm* — Foley & Lardner LLP (57) ABSTRACT

Presented herein are systems and methods for regularly updating computer-form files. A method may include obtaining, by a computer, raw data containing a plurality of data records associated with a customer from a plurality of databases, for each data record, determining, by the computer, a data category indicating one or more computer-form files for a data entry of the data record based upon a preconfigured mapping between a type of data of the data entry mapped to the data category, in response to detecting a new customer data requirement, updating, by the computer, the one or more computer-form files associated with each data category according to each data record of each daily interval, and at a preconfigured time, generating, by the computer, the one or more computer-form files based upon each data category using each data record of each daily interval.

20 Claims, 4 Drawing Sheets

(56) References Cited

U.S. PATENT DOCUMENTS

2022/0345483 A1 10/2022 Shua
2024/0160557 A1* 5/2024 Bolshakov ................ G06F 8/60
 707/707

* cited by examiner

SYSTEM AND METHOD FOR REGULAR UPDATES TO COMPUTER-FORM FILES

CROSS-REFERENCE TO RELATED APPLICATION

This application is a continuation of U.S. application Ser. No. 18/099,824, filed Jan. 20, 2023, which is incorporated by reference in its entirety.

TECHNICAL FIELD

This application generally relates to managing databases for transactional data and automated generation of computer-generate form files from database records.

BACKGROUND

Tax accounting and bookkeeping is an arduous manual process which has, in recent years, been automated with the help of tax accounting software. For instance, software programs can populate forms using information provided by a user. However, there are problems with conventional tax accounting software and systems. Conventional tax accounting software requires significant user input and suffers from large computing loads when taxes are calculated.

Computer-generated form files that incorporate various types of data from a variety of data sources are often prone to errors due to the difficulty in handling large amounts of data from the different sources. Generating computer-form files using a large amount of data represents a large processing burden, leading to delays in spotting and fixing errors.

SUMMARY

A problem for servicing global banking clients is that the tax reporting obligations across different countries vary, and each of those reports can vary widely in the types of information they require. If the customer circumstances change, such as moving jurisdictions (e.g., US to Switzerland in the middle of the year), the customer's obligatory reporting requirements for that specific tax year vary, as do the rules and information needed for the report. Conventional technical solutions cannot efficiently and accurately address these complications.

What is needed is a computing system that improves upon conventional software programs and computing systems, including systems and methods that solve technical problems of high processing burdens associated with periodic generation of computer-form files, as well as the technical problems of requiring extensive user input.

Embodiments discussed herein include a system that iteratively checks the client's data daily to prepare for completion of the requisite reporting data output and confirm whether there is a need to prepare different tax reporting output(s) for the client. The system may regularly (e.g., daily) collect, extract, and consolidate necessary reporting data and prepare necessary data (e.g., automated reconciliation bank income payments, withholding taxes, custodian income payments against tax jurisdictions or regime specific governments). The system may proactively and daily manage data quality exceptions, such as errors in the reporting data. The system may develop a hierarchy of data categories based on customizable software configurations for quickly identifying and preparing the data required for dynamically identified forms (e.g., FATCA, CRS, US 1099, US 1098, US 1042-S, US 1042, FBAR, UK BBSI/OI, CA T511) according to an identified jurisdiction(s). At a preconfigured tax preparation time, the system prepares tax reportable data output using an aggregation of the processed client data from each of the previous days throughout the entire relevant timeframe, such as a user-selected timeframe or a given tax-year, thereby saving time and reducing a likelihood of errors.

Aspects of the present disclosure are directed to a computer-implemented method may include, at a daily interval, obtaining, by a computer, raw data containing a plurality of data records associated with a customer from a plurality of databases, for each data record, determining, by the computer, a data category indicating one or more computer-form files for a data entry of the data record based upon a preconfigured mapping between a type of data of the data entry mapped to the data category, in response to detecting a new customer data requirement, updating, by the computer, the one or more computer-form files associated with each data category according to each data record of each daily interval, and at a preconfigured time, generating, by the computer, the one or more computer-form files based upon each data category using each data record of each daily interval.

In some embodiments, the computer-implemented method may include detecting the new customer data requirement by comparing the one or more computer-form files to a list of active computer-form files and determining that the one or more computer-form files are not present in the list of active computer-form files.

In some embodiments, the data category may include a recipient of a subset of the one or more computer-form files.

In some embodiments, the computer-implemented method may include, in response to a user input, generating, by the computer, the one or more computer-form files based upon each data category using each data record of each daily interval.

In some embodiments, the computer-implemented method may include determining the data category for a data entry includes requesting, from one or more databases of the plurality of databases, additional information associated with the data entry.

In some embodiments, detecting a new customer data requirement includes identifying the new customer data requirement based on the plurality of data records.

In some embodiments, the computer-implemented method may include splitting a data entry into a first sub-entry and a second sub-entry based on the data entry being mapped to a particular data category in the preconfigured mapping, where the first sub-entry is mapped to a first data category and the second sub-entry is mapped to a second data category in the preconfigured mapping.

In some embodiments, the computer-implemented method may include, in response to detecting a new customer data requirement, generating an alert.

In some embodiments, the computer-implemented method may include, prior to updating the one or more computer-form files, filtering the one or more data entries based on one or more characteristics of the one or more computer-form files.

In some embodiments, the computer-implemented method may include updating, based on the categorized data entries of the plurality of data records, a report, and verifying, at the preconfigured time, the one or more computer-form files using the report.

Aspects of the present disclosure are directed to a system including a processor, a non-transitory, computer-readable medium including instructions which, when executed by the processor, cause the processor to at a daily interval, obtain raw data containing a plurality of data records associated with a customer from a plurality of databases, for each data record, determine a data category indicating one or more computer-form files for a data entry of the data record based upon a preconfigured mapping between a type of data of the data entry mapped to the data category, in response to detecting a new customer data requirement, update the one or more computer-form files associated with each data category according to each data record of each daily interval, and at a preconfigured time, generate the one or more computer-form files based upon each data category using each data record of each daily interval.

In some embodiments, detecting the new customer data requirement includes comparing the one or more computer-form files to a list of active computer-form files and determining that the one or more computer-form files are not present in the list of active computer-form files.

In some embodiments, the data category includes a recipient of a subset of the one or more computer-form files.

In some embodiments, the instructions further cause the processor to, in response to a user input, generate, by the computer, the one or more computer-form files based upon each data category using each data record of each daily interval.

In some embodiments, determining the data category for a data entry includes requesting, from one or more databases of the plurality of databases, additional information associated with the data entry.

In some embodiments, detecting a new customer data requirement includes identifying the new customer data requirement based on the plurality of data records.

In some embodiments, the instructions further cause the processor to split a data entry into a first sub-entry and a second sub-entry based on the data entry being mapped to a particular data category in the preconfigured mapping, wherein the first sub-entry is mapped to a first data category and the second sub-entry is mapped to a second data category in the preconfigured mapping.

In some embodiments, the instructions further cause the processor to, in response to detecting a new customer data requirement, generate an alert.

In some embodiments, the instructions further cause the processor to, prior to updating the one or more computer-form files, filter the one or more records based on one or more characteristics of the one or more computer-form files.

In some embodiments, the instructions further cause the processor to update, based on the categorized data entries of the plurality of data records, a report, and verify, at the preconfigured time, the one or more computer-form files using the report.

It is to be understood that both the foregoing general description and the following detailed description are exemplary and explanatory and are intended to provide further explanation of the embodiments described herein.

BRIEF DESCRIPTION OF THE DRAWINGS

The accompanying drawings constitute a part of this specification, illustrate an embodiment, and together with the specification, explain the subject matter of the disclosure.

DETAILED DESCRIPTION

Reference will now be made to the embodiments illustrated in the drawings, and specific language will be used here to describe the same. It will nevertheless be understood that no limitation of the scope of the disclosure is thereby intended. Alterations and further modifications of the features illustrated here, and additional applications of the principles as illustrated here, which would occur to a person skilled in the relevant art and having possession of this disclosure, are to be considered within the scope of the disclosure.

Current technological solutions do not include a centralized automated system, tool, or platform that performs various automated processes. Embodiments described herein include systems and methods that perform these automated processes. The system may collect various types of data based on customer reporting requirements from any number of data sources, and extract and consolidate the requisite types of data to satisfy the customer reporting requirements. The system may prepare the necessary types of data (e.g., bank income payment data, withholding taxes data, custodian income payments) based on reporting requirements (e.g., jurisdictional tax data reporting requirements). Preparing the necessary data includes performing automated daily evaluation of customer data records and reporting requirements, and, if necessary, performing reconciliation of the types of data and forms against updated reporting requirements. The system may proactively manage data quality and data quality exceptions, which may include proactively reconciling or modifying data inputs and formats according to exception management configurations, which may be entered into the system from client devices via a user interface. In operation, the system may ensure correctness and accuracy of the data to be reported and included in the computer-generated forms.

The system may run the reconciliation, updating, or modification processes on a daily basis to improve efficiency in network environment resources and end-users by imposing data quality standards a daily basis. Additionally or alternatively, the system may generate outputs containing the various types of reporting data, which may include completing or otherwise generating the computer-generate form files containing the requisite output data. For instance, the system may determine based on certain location data in the customer's data records that indicate which jurisdiction reporting requirements apply to the customer data. The system may determine certain form files (e.g., ATCA, CRS, US 1099, 1098, 1042-S (FDAP and BDI), 1042, FBAR, UK BBSI/OI (Section 17/18), Canadian T511) must be prepared on behalf of the customer. The system may generate the selected computer-generated form files using the requisite types of reporting data.

Embodiments disclosed herein generally include systems and methods for regularly (e.g., hourly, daily, weekly) evaluating and updating computer-form files using data from various data sources. Regularly evaluating and updating computer-form files solves the technical problem of high processing burdens associated with conventionally longer periods between processes for generating computer-form files. For example, generating computer-form files once a year, where the generation of the computer-form files involves processing a substantially larger number of data records (e.g., thousands of data records for a year compared to a dozen or so for a day) represents a significant processing burden. Such processing burdens prevent efficient data analysis and identification of errors in the data records. Furthermore, mass processing of data records introduces errors into the processing of the data records, resulting in errors in the computer-form files. Regularly updating computer-form files represents a technical solution to the problem of high processing burdens due to periodic generation of the computer-form files.

Furthermore, automatic categorization of the data records solves the technical problem of assigning the data records to the computer-form files for generating the computer-form files. The data records may include data records of various types having various parameters. Categorizing the data records based on various different types of data records and/or parameters of data records may prevent errors in assigning data records to computer-form files, reducing the processing burden associated with generating the computer-form files. Conventional systems require significant user input for determining how data records should be assigned to various computer-form files. Automatic categorization of the data records for regularly updating computer-form files represents an improvement in the field of generating computer-form files.

Furthermore, automatic categorization of the data records may be used to detect new customer data requirements. New customer data requirements may be caused by one or more events, which may be automatically detected based on the automatic categorization of the data records. The new customer data requirements may require the addition, deletion, or modification of one or more computer-form files from a list of computer-form files to be generated. The addition, deletion, or modification of one or more computer-form files form the list of computer-form files to be generated may cause a cascade of alterations or modifications in the assignment of data records to the computer-form files. Regularly updating the computer-form files and the accompanying updating of the list of the computer-form files to be generated as informed by the automatically detected events may prevent errors caused by erroneous assignment of data records to computer-form files. In this manner, the processing burden and time required to generate the computer-form files may be decreased. This improves the function of a computer used to generate the computer-form files and represents an improvement to the field of generating computer-form files.

Figure 1:
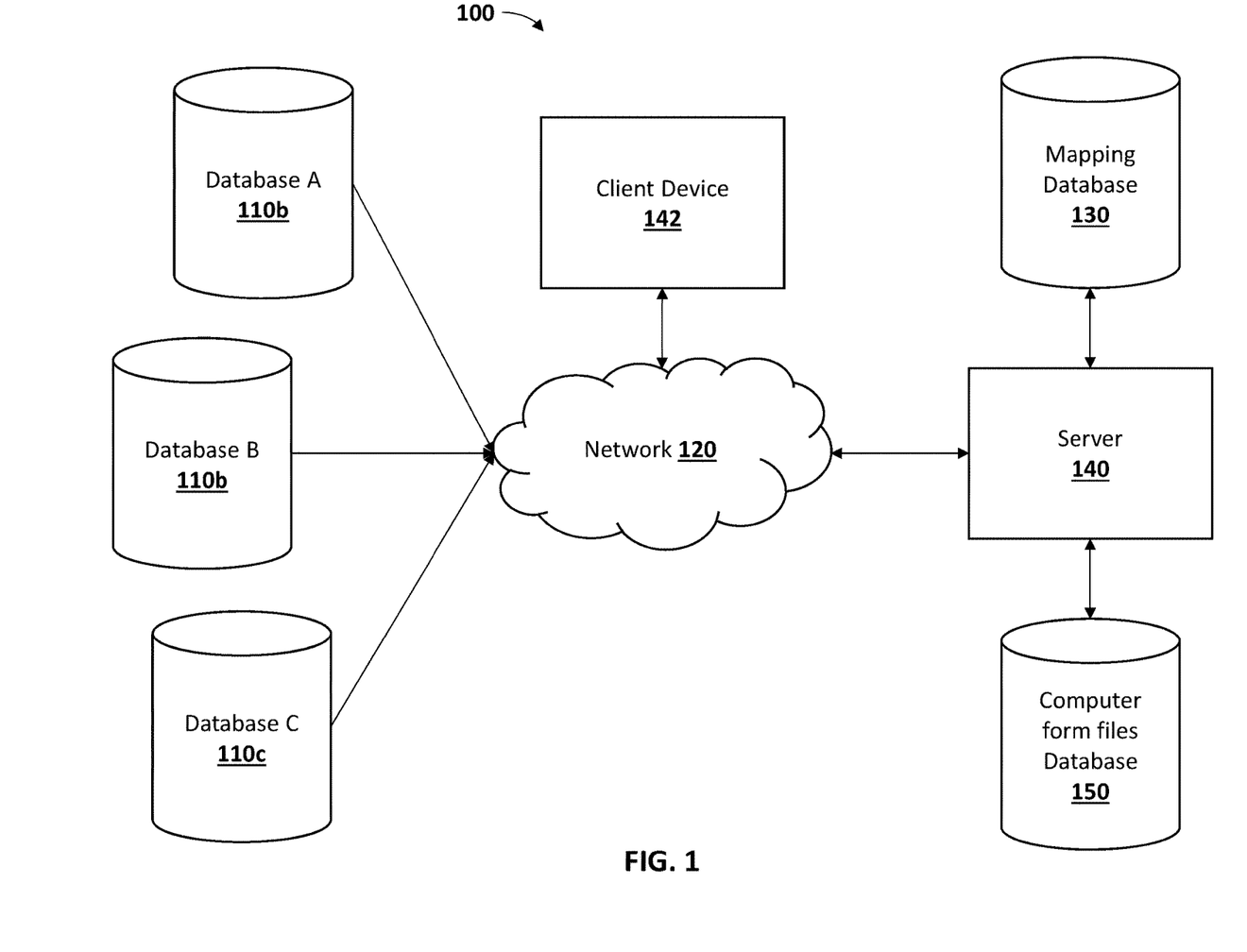
FIG. 1 is a block diagram of a network environment, in accordance with one or more embodiments.

FIG. 1 is a block diagram of a network environment 100, in accordance with one or more embodiments. The environment 100 may include database A 110*a*, database B 110*b*, and database C 110*c*, referred to collectively as databases 110. The databases 110 may be in communication with a server 140 via a network 120. The network 120 may be a WAN, such as the internet, or any kind of network. The server 140 may be in communication with a mapping database 130 and a computer-form files database 150. The server 140 may receive data records from the databases 110, a mapping from the mapping database 130, and computer-form files from the computer-form files database 150.

The data records may include demographic data, entity data, transaction data, and other kinds or types of data. Data types may be defined based on other data entries associated with a particular data entry and/or parameters of the particular data entry including a source of the particular data record, a custodian of the particular data record, and other parameters. Each data entry may be associated with one data type. Each data entry may be associated with multiple data types. In some implementations, a first data entry of a data record is associated with a first data type and a second data entry of a data record is associated with a second data type.

The server 140 includes any computing device comprising hardware and software components capable of performing the various processes described herein. Non-limiting examples of the server 140 include a server computer, workstation computer, tablet computer, and the like. The server 140 receives the various types of data from the databases 110 and/or computer-form files database 150, and performs various operations including categorizing the received data from the databases 110 using data mappings stored in the mapping database 130 or generated by the server 140; detecting a new customer data requirement based on the received data; updating the computer-form files from the computer-form files database 150; and, at a preconfigured time, generating the one or more computer-form files based on the categorized data.

The server 140 receives the data records at regular preconfigured intervals (e.g., daily, weekly) or continuously. Using the data records, the server 140 categorizes data entries of the data records at the preconfigured interval or continuously. The server 140 categorizes the data entries of the data records according to, for example, a data type, or types of data entries and/or data records.

The regular interval may be any short-term timeframe in which the server 140 can categorize the data entries of the data records received during the timeframe. For example, the regular interval may be daily if the server 140 can categorize the data entries of the data records for a given day so as to avoid CPU bottlenecking. In some cases, the regular interval may be adjusted dynamically based on the number of data records received and the processing resources of the server 140. In this way, the server 140 avoids delays caused by CPU bottlenecking due to attempting to process large amounts of data. Further, the server 140 may categorize the data entries of the data records without visible delay, allowing for detection and correction of errors.

The server 140 may categorize the data entries into data categories based on a preconfigured mapping between data types and the data categories. The server 140 may use the mapping from the mapping database 130 to determine one or more data categories for each data entry based on the data type or data types associated with each data entry. For example, the server 140 may categorize a transaction data entry as income-based data based on determining that the type of transaction data entry indicates a receipt of income funds. The server 140 may apply the mapping to each data entry to determine the data category for each data entry. In some cases, the mapping specifies one or more data categories for each data type. In some cases, the mapping specifies a data category for each data entry based on multiple data types of the data entry. For example, the server 140 categorizes a transaction as a transfer based on a first type of the transaction being a receipt of funds and a second type of the transaction being a transfer of funds. The data categories may correspond to or indicate computer-form files. For example, a data category of income may correspond to one or more tax forms for reporting income.

The server 140 may analyze the data records to detect new customer data requirements. In some implementations, the server 140 may detect the new customer data requirements by determining that a data category of a data entry of a data record indicates a computer-form file not included in a list of computer-form files. In some implementations, the server 140 may detect the new customer data requirements based on a change in data records received, a data record indicating a new customer data requirement, and/or a combination of data records. For example, the server may receive data records associated with a new address of a customer, where the new address is located in a jurisdiction requiring the new customer data requirement (e.g., new data types, new computer-form files). In another example, the server may receive data records associated with a new entity associated with a customer, where the new data requirement includes information associated with the new entity.

The server 140 updates the one or more computer-form files associated with each data category based on detecting the new customer data requirements. The server 140 may update the one or more computer-form files by retrieving additional computer-form files from the computer-form files database 150. The server 140 may update the one or more computer-form files by retrieving updated computer-form files from the computer-form files database 150. In some implementations, updating the one or more computer-form files includes updating the categories used for categorizing the data records.

The databases 110 may be located in various different jurisdictions and/or contain types of data relevant to particular jurisdictions. For example, database A 110*b* may be located in a first jurisdiction, database B 110*b* may be located in a second jurisdiction, and database C 110*c* may be located in a third jurisdiction. The data records from the databases 110 may be tagged with or include a parameter indicating from which jurisdiction and/or from which database the server 140 receives the data records. In some implementations, the data records and or the data entries of the data records may differ in format based on from which database and/or jurisdiction the server 140 receives the data records. The data records may include transaction data. The databases 110 may be associated with various different entities. The databases 110 may include transaction data for the various different entities. In some implementations, the database A 110*a* may include demographic information of a customer, including place of residence, citizenship, and other demographic information. In some implementations, each respective data record may include a first data entry representing demographic information and a second data entry representing transaction data. The demographic information may be received by the server 140. The demographic information may affect the categorization of the data records and/or the list of computer-form files updated by the server 140.

The system 100 may include a client device 142. The client device 142 may be any device including a memory and a processor capable of communicating, via the network 120 with the server 140. The client device 142 may allow a user, via a user interface, to add, remove, and/or edit configurations of the server 140. In some implementations, the configurations may modify the mapping, the data categories, and/or the one or more computer-form files. For example, the user may, via the user interface, modify the mapping of a particular data type to a particular data category based on an update to a particular computer-form file. In another example, the user may, via the user interface, modify the mapping of dividend income from short-term gains to long-term gains based on an update to a tax form for reporting dividend income. In some implementations, the configurations may modify the generation of the one or more computer-form files based on the categorized data entries. For example, a configuration may include one or more algorithms for generating the one or more computer-form files based on the categorized data entries. The user may, via the user interface, add or remove one or more databases of the databases 110. The user may, via the user interface, add or remove intended recipients of the one or more computer-form files. For example, the user may add or remove jurisdictions for reporting tax forms.

The server 140 may automatically detect and correct errors in the data records. In some implementations, the server 140 may automatically detect the errors in the data records by reconciling the data records against data configurations associated with the computer-file forms. For example, the server 140 may automatically perform reconciliation of bank income payments, withholding taxes, custodian income payments, etc. against tax jurisdiction or government-specific regulations associated with tax forms. The server may automatically correct the errors in the data records. For example, the server interface may provide automatic preemptive reconciliation and exception management via the user interface. The server may generate an alert on the user interface of the client device 142 to correct the errors. The server may request additional data records from the databases 110 to correct the errors. The server may iteratively correct the errors until no errors remain.

The server 140 generates a report based on the categorized data entries. The server 140 may generate the report at a predetermined time, such as at a tax preparation time. The server 140 may generate the report in response to user input via the user interface. The report may include the one or more computer-form files, generated using the categorized data entries. For example, the report output data may include computer-fillable files representing tax forms (e.g., FATCA, CRS, US 1099, US 1098, US 1042S (FDP and BDI), US 1042, US FBAR, UK BBSI/OI (Section 17/18), CA T511) relative to a given jurisdiction that the server 140 determines are relevant to the customer. The user may, via the user interface of the client device 142, add or remove a computer-form file from the report. The user may, via the user interface of the client device 142, add or remove a set of computer-form files from the report. For example, the user may, via the user interface, add or remove tax forms associated with jurisdictions from the report.

Figure 2:
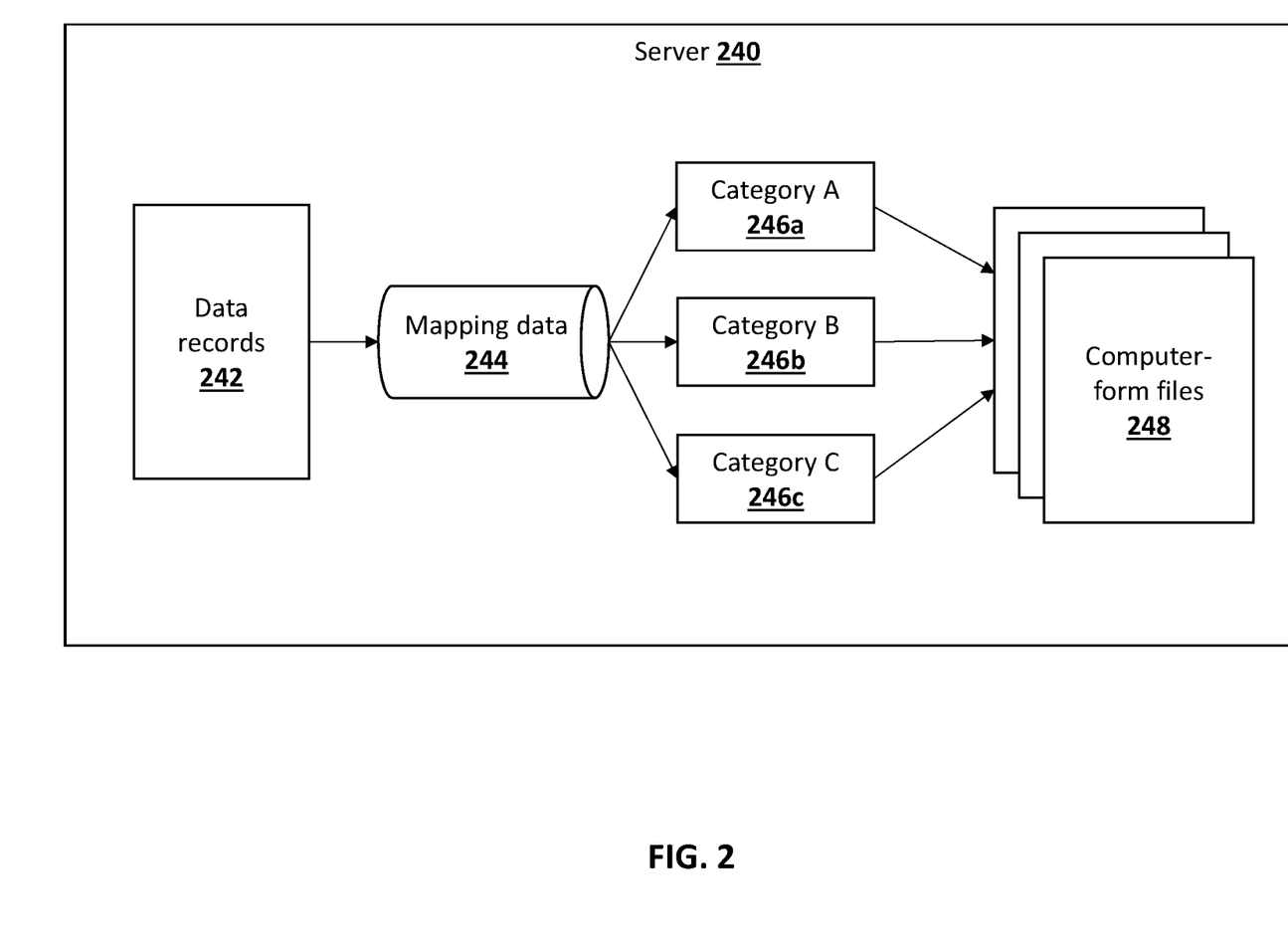
FIG. 2 is a block diagram of a server, in accordance with one or more environments, in accordance with one or more embodiments.

FIG. 2 is a block diagram of a server 240, in accordance with one or more environments. The server 240 may be the server 140 of FIG. 1. The server 240 may include data records 242. The server 240 may receive the data records 242 from a plurality of databases, such as the databases 110 of FIG. 1. The server 240 may include mapping data 244. The server 240 may receive the mapping data 244 from a mapping database such as the mapping database 130 of FIG. 1. The server 240 may include computer-form files 248. The server 240 may receive the computer-form files 248 from a computer-form files database, such as the computer-form files database 150 of FIG. 1.

The server 240 may categorize data entries of the data records 242, or determine a data category for each data entry of the data records 242. The server 240 may include a category A 246*a*, a category B 246*b*, and a category C 246*c*, referred to collectively as categories 246. In some implementations, the categories 246 may be a plurality of categories.

The server 240 may determine a category for each of the data entries of the data records 242 by applying the mapping data 244 to the data entries. The mapping data 244 may be a preconfigured mapping between data types of the data entries and the categories 246. For example, the mapping data 244 may map funds received to an income category. The server may categorize the data entries based on a source of the data records and/or a custodian of the data records. For example, the mapping data 244 may map funds received to a transfers category based on the funds being sent from a first account of a customer to a second account of a customer. In some implementations, the server 240 may determine the data types of the data entries to apply the mapping data 244 to the data entries. In some implementations, the server 240 may use the mapping data 244 to determine the data types of the data entries and the categories 246 corresponding to the data types to categorize the data entries. The server 240 may receive the data records 242 at a daily interval and categorize the data entries of the data records 242 at the daily interval. In this way, the server 240 may avoid CPU-bottlenecking caused by categorizing more than an efficient, manageable, daily amount of the data entries of the data records 242 at one time.

The categories 246 may be organized hierarchically. The category A 246a may include the category B 246b such that all data entries mapped to the category B 246b are also mapped to the category A 246a. For example, a category "US transactions" may include a category "US income" such that all data entries mapped to the category "US income" are also mapped to the category "US transactions." The hierarchy of categories may include any number of levels. In some implementations, the server 240 may determine categories for the data entries iteratively, per level of the hierarchy of categories.

The server 240 applies the categorized data entries to the computer-form files. The server 240 may apply the categorized data entries to populate one or more fields of the computer-form files. In some implementations, the server 240 may apply a first subset of the data entries corresponding to the category A 246a to populate a first subset of fields of one or more computer-form files 248 and the server 240 may apply a second subset of the data entries corresponding to the category B 246b to populate a second subset of fields of the one or more computer-form files 248. For example, demographic information corresponding to a first category may be used to populate first fields of a particular computer-form file and transaction information corresponding to a second category may be used to populate second fields of the particular computer-form file. In some implementations, the server 240 may apply the categorized data entries to the computer-form files 248 when the computer-form files 248 are generated. For example, the server 240 may store the categorized data entries and a list of the computer-form files 248 and, at a preconfigured time, or based on user input, generate the computer-form files 248 based on the categorized data entries. In some implementations, the server 240 may regularly apply the categorized data entries to the computer-form files 248, such as daily.

The categories 246 may each correspond to the computer-form files 248 on a one-to-one basis. For example, the category A 246a may correspond to a first computer-form file of the computer-form files 248 and the category B 246b may correspond to a second computer-form file of the computer-form files 248. The categories 246 may correspond to different portions or fields of the computer-form files 248. The server 240 may determine one category of the categories 246 for each data entry. The server 240 may determine multiple categories of the categories 246 for one or more data entries of the data records 242. The server 240 may split a data record of the data records 242 into a first sub-record and a second sub-record and assign the data entries of the first sub-record to the category A 246a and the data entries of the second sub-record to the category B 246b.

The server 240 may update the computer-form files based on detecting a new customer data requirement. In some implementations, the server 240 may detect the new customer data requirement based on the mapping data 244. The mapping data 244 may map one or more data entries of the data records 242 to the category C 246c corresponding to a missing computer-form file not found in the computer-form files 248. The server 240 may determine that the one or more data entries of the data records 242 represent a new customer data requirement. The server 240 may update the computer-form files 248 to include the missing computer-form file. The server 240 may detect the new customer data requirement based on the data records 242 received in a time period, such as a day. The server 240 may update the computer-form files 248 such that the data entries received in a subsequent time period, such as a subsequent day, may be categorized according to the categories 246 and the corresponding computer-form files 248. By detecting new customer data requirements based on daily data records 242 and updating the computer-form files 248 accordingly, the server 240 avoids incorrectly categorizing the data entries, failing to categorize the data entries, or experiencing CPU bottlenecking due to attempting to categorize more than a daily amount of the data entries at one time.

Figure 3:
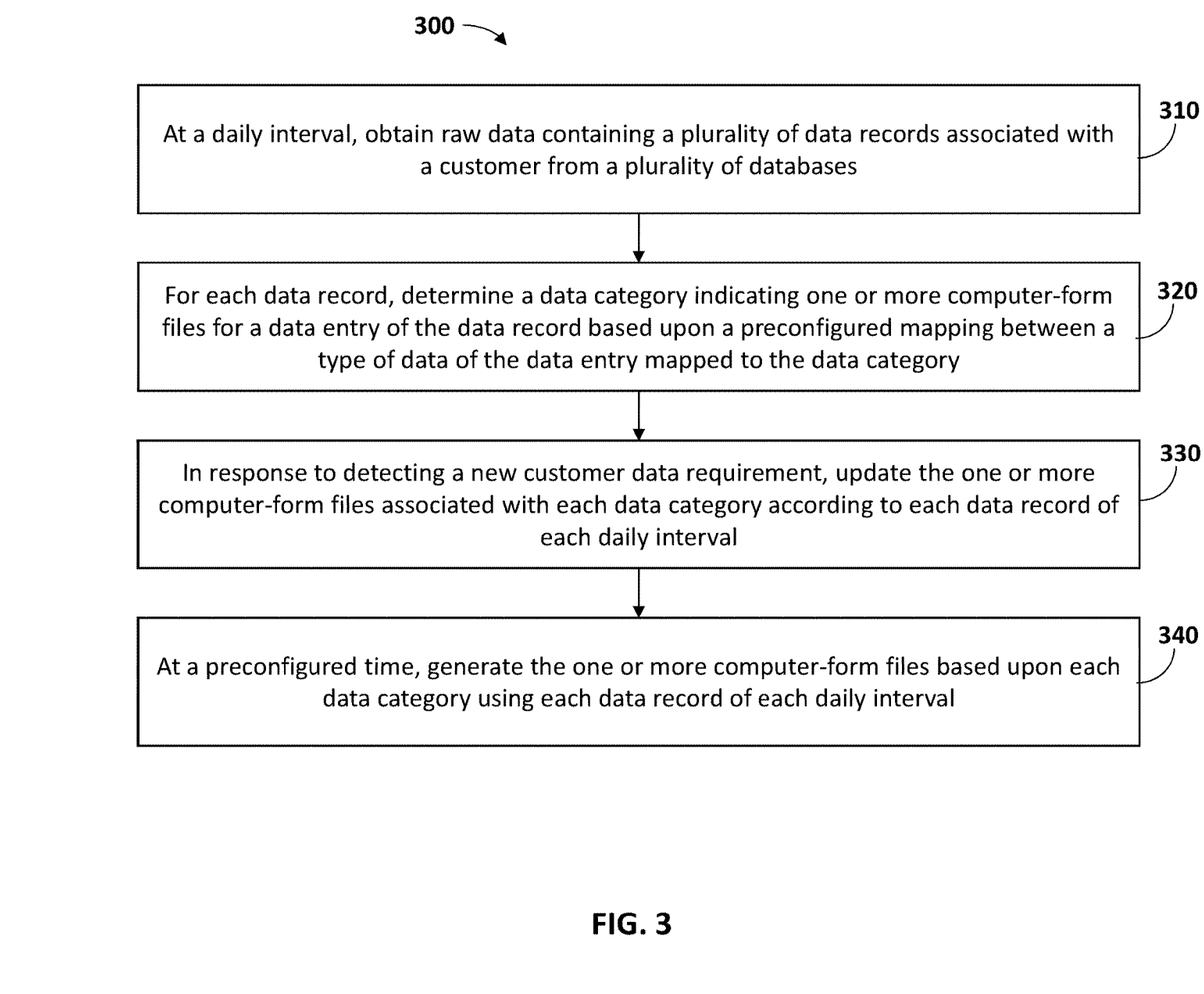
FIG. 3 is a flow chart illustrating operations of a method for updating computer-form files, in accordance with one or more embodiments.

FIG. 3 is a flow chart illustrating operations in a method 300 for updating computer-form files. The method 300 may include more or fewer operations than shown. The operations shown may be performed in the order shown, in a different order, or concurrently. The method 300 may be performed by the server 140 of FIG. 1 or the server 240 of FIG. 2.

At operation 310, a server, at a daily interval, obtains raw data containing a plurality of data records associated with a customer from a plurality of databases. The plurality of data records includes a plurality of data entries. The data entries may include various data types. For example, a first data entry may be demographic information and a second data entry may be transaction data. The server can identify, parse, or categorize data entries as indicated by data type. Obtaining the raw data at a daily interval offers the technical advantage of reducing a processing burden on the server associated with receiving and categorizing the data records.

At operation 320, the server, for each data record, determines a data category indicating one or more computer-form files for a data entry of the data record based upon a preconfigured mapping between a type of data of the data entry mapped to the data category. In some cases, the server determines the type of data or data type of the data entry in order to map the data entry to a data category. The server may apply the mapping data to determine the type of data of the data entry and maps the type of data to the data category. For example, the mapping data may include a mapping between data formats and data types as well as a mapping between data types and data categories.

In some implementations, the server determines the type of data of the data entry based on an indication in the data record of the type of data. For example, the data record may be marked or tagged as including income or transfer transactions. In some implementations, the data category includes or corresponds to a recipient of a subset of the one or more computer-form files. For example, the subset of the one or more computer-form files may be intended for the recipient and the data category may indicate the recipient of the subset of the one or more computer-form files.

In operation, the server may determine the data category for the data entry by requesting, from one or more databases of the plurality of databases, additional information associated with the data entry and/or the data record of the data entry. For example, an incomplete data entry or data record may require requesting a corrected data entry or a corrected data record from the plurality of databases. In another example, an incorrect data entry or data record may require requesting a corrected data entry or a corrected data record from the plurality of databases. Beneficially, receiving and processing data records on a daily interval prevents or mitigates CPU bottlenecking and/or network bottlenecking caused by categorizing a large number of data records and/or requesting a large number of corrected data entries and/or data records from the plurality of databases.

In some implementations, the server splits a data entry into a first sub-entry and a second sub-entry based on the data entry being mapped to a particular data category in the preconfigured mapping, wherein the first sub-entry is mapped to a first data category and the second sub-record is mapped to a second data category in the preconfigured mapping. In some implementations, the first sub-entry and the second sub-entry are the same. In some implementations, the first sub-entry and the second sub-entry are different. In an example, a transaction is copied to be applied to a first computer-form file in a first format and applied to a second computer-form file in a second format. In another example, a first portion of a transaction is mapped to a first category and a second portion of a transaction is mapped to a second category.

At operation 330, the server, in response to detecting a new customer data requirement, updates the one or more computer-form files associated with each data category according to each data record of each daily interval. The server may detect the new customer data requirement by comparing the one or more computer-form files to a list of active computer-form files and determining that the one or more computer-form files are not present in the list of active computer-form files. In some implementations, the server generates an alert in response to detecting the new customer data requirement. For example, the server may send a notification to a user to notify the user and/or customer that a new customer data requirement has been detected. The user and/or customer may verify the new customer data requirement.

At operation 340, the server, at a preconfigured time, generates the one or more computer-form files based upon each data category using each data record of each daily interval. The server references the data records containing the categorized data entries to generate the one or more computer-form files at the preconfigured time. For example, the server may generate a computer-form file associated with income using data entries categorized as income in the data records. The server may generate the one or more computer-form files and regularly (e.g., daily) evaluates and, if needed, modifies the one or more computer-form files being used or data field(s) of the one or more computer-form files, based on the categorized data entries or changes to the data entries.

The server may, in response to a user input, completes the data fields, or otherwise generates, the one or more computer-form files based upon each data category using each data record, as evaluated each daily interval. A user may generate the computer-form files at any time to view the computer-form files generated using the data records, allowing the user to verify the accuracy of the computer-form files. This is made possible by daily categorization of the data entries of the data records and represents an improvement in the field of computer-form file generation.

In some implementations, the server updates a report based on the categorized data entries of the plurality of data records and verifies, at the preconfigured time, the one or more computer-form files using the report. In an example, the report may represent an aggregation of data entries which are used to generate the one or more computer-form files and the report may be used to verify an accuracy of generating the one or more computer-form files.

Figure 4:
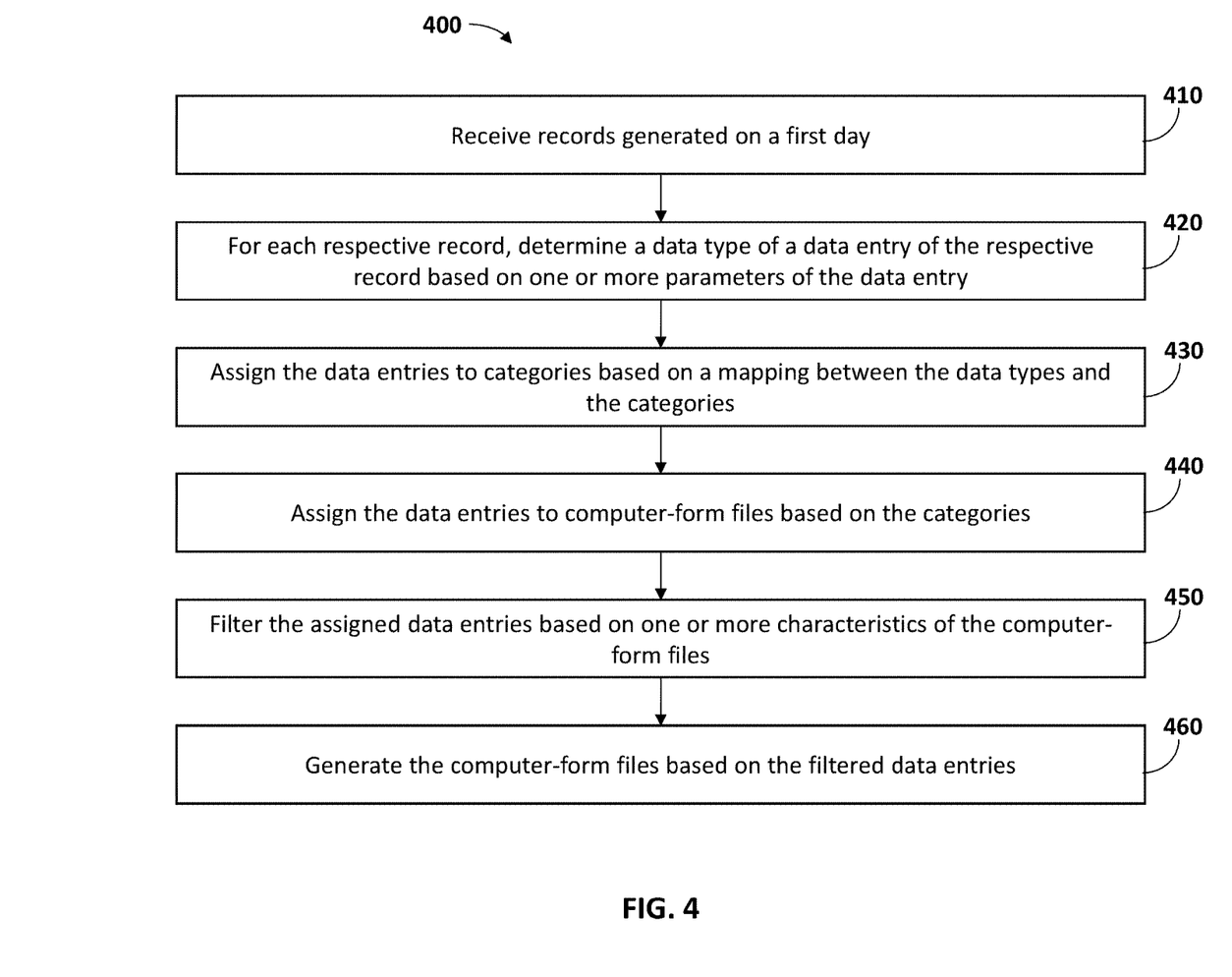
FIG. 4 is a flow chart illustrating operations of a method for updating computer-form files, in accordance with one or more embodiments.

FIG. 4 is another flowchart 400 illustrating operations for updating computer-form files. The method 400 may include more or fewer operations than shown. The operations shown may be performed in the order shown, in a different order, or concurrently. The method 400 may be performed by the server 140 of FIG. 1 or the server 240 of FIG. 2.

At operation 410, a server receives records generated on a first day. The server may receive the records from a plurality of databases. The records may include demographic information and/or transaction information. Each of the records may include a plurality of data entries, where each data entry has a data type. Receiving records generated on a first day reduces the computing resources required to receive and process the records, reducing CPU bottlenecking.

At operation 420, the server, for each respective record, determines a data entry type of a data entry of the respective record based on one or more parameters of the data entry. The server may determine the data entry type based on one or more parameters of the data entry. The server may determine the data entry type based on one or more related data entries. The server may determine the data entry type based on one or more parameters of the respective record. The server may determine the data entry type based on any combination of the above.

At operation 430, the server assigns the data entries to categories based on a mapping between the data types and the categories. In some implementations, the server maintains a data structure for each respective category within which the data entries corresponding to the respective category are stored. In some implementations, the server tags the data entries with a tag corresponding to the categories to which the data entries are assigned. In some implementations, the server generates an indexed ledger indicating which data entries are assigned to which categories.

At operation 440, the server assigns the data entries to computer-form files based on the categories. The server assigns the data entries based on configurations indicating the particular computer-form files. In some implementations, the server maintains a preliminary version of each computer-form file of the computer-form files and incorporates the data entries into their assigned computer-form files. In some implementations, the server tags the data entries with a tag corresponding to the computer-form files. Additionally or alternatively, the server generates an indexed ledger indicating which data entries are assigned to which computer-form files.

At operation 450, the server filters the assigned data entries based on one or more characteristics of the computer-form files. The server may filter the data entries such that a data entry may be used in generating a first computer-form file to which the data entry is assigned and not used in generating a second computer-form file to which the data entry is assigned. The server may mark filtered data entries as not to be used in generating a particular computer-form file. In other implementations, the server does not incorporate the filtered data entries into a preliminary version of the particular computer-form file. In operation, the server filters data entries assigned to a particular computer-form file based on the particular computer-form file being associated with an entity which requires inclusion of some data entries, but not other data entries in the computer-form file.

As an example, transactions associated with mortgage interest payments may be included in US tax forms, but not UK tax forms. The mortgage interest payment transactions may be assigned to the UK tax forms based on their category, but filtered out so they are not used in generating the UK tax forms. In another example, the server receives records associated with relocation of a customer from a first address to a second address, where the second address is associated with different computer-form files than the first address. Subsequent transactions required by the computer-form files associated with the first address but not required by the computer-form files associated with the second address are filtered out, such that they are not used in generating the computer-form files associated with the second address.

At operation 460, the server generates the computer-form files based on the filtered data entries. The server may generate the computer-form files using only the data entries that are not filtered-out by the server for each computer-form file. The server may update previously generated computer-form files based on the filtered data entries.

In one example, a tax form server may receive a plurality of data records from a plurality of databases each day. The plurality of data records each includes data entries affecting one or more tax forms for a customer. The customer has customer data requirements dictating which tax forms are required. The tax form server determines a data category for each data entry of each data record on a daily basis. By categorizing the data entries on a daily basis, the tax form server avoids processing delays and CPU bottlenecking caused by attempting to categorize a larger number of data entries at a time. The tax form server may categorize the data entries using a preconfigured mapping between data types of the data entries and the data categories. The categories correspond to tax forms required for the customer.

The server detects, based on the data entries and/or the data records, that the customer has a new customer data requirement requiring the inclusion of a new tax form. The tax form server updates the tax forms to include the new tax form and updates the categories to include a new category for the new tax form. At the end of a tax year, the tax form server generates the tax forms required for the customer based upon each category using each data record of each daily interval.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc., are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method comprising:
at a daily interval:
   obtaining, by a computer, raw data containing a plurality of data records associated with a customer from a plurality of databases;
   in response to detecting an error in an error data record of the plurality of data records, wherein the error includes a format of the data record, obtaining, by the computer, a corrected data record for the plurality of data records to correct the detected error, wherein obtaining the corrected data record includes modifying the error data record to correct the error;
   for each data record of the plurality of data records, determining, by the computer, a data category indicating one or more computer-form files for a data entry of the data record based upon a preconfigured mapping between a type of data of the data entry mapped to the data category; and
   in response to detecting a new customer data requirement, updating, by the computer, the one or more computer-form files associated with each data category according to each data record of each daily interval; and
at a preconfigured time, generating, by the computer, the one or more computer-form files based upon each data category using each data record of each daily interval.

2. The computer-implemented method of claim 1, wherein detecting the error data record of the plurality of data records is based on a comparison of one or more data records of the plurality of data records against one or more data configurations associated with the computer-file forms.

3. The computer-implemented method of claim 2, wherein the one or more data configurations include one or more algorithms for generating the one or more computer-form files.

4. The computer-implemented method of claim 2, further comprising receiving, by the computer, user input to modify at least one of the one or more data configurations.

5. The computer-implemented method of claim 1, wherein obtaining the corrected data record includes iteratively modifying error data records to correct errors until no errors remain.

6. The computer-implemented method of claim 1, wherein modifying the error data record to correct the error includes modifying the format of the data record according to a predefined exception management configuration.

7. The computer-implemented method of claim 1, wherein obtaining the corrected data record includes requesting user input to correct the error.

8. The computer-implemented method of claim 1, wherein obtaining the corrected data record includes requesting, from one or more databases of the plurality of databases, additional data records.

9. The computer-implemented method of claim 1, wherein detecting the error data record of the plurality of data records is based on a comparison of one or more data records of the plurality of data records against one or more data-exception configurations for corresponding one or more types of data in the plurality of data records.

10. The computer-implemented method of claim 1, further comprising detecting, by the computer, the error based on the determined data category for the error data record.

11. A system comprising:
a processor; and
a non-transitory, computer-readable medium comprising instructions which, when executed by the processor, cause the processor to:
   at a daily interval:
      obtain raw data containing a plurality of data records associated with a customer from a plurality of databases;
      in response to detecting an error in an error data record of the plurality of data records, wherein the error includes a format of the data record, obtain a corrected data record for the plurality of data records to correct the detected error, wherein obtaining the corrected data record includes modifying the error data record to correct the error;
      for each data record, determine a data category indicating one or more computer-form files for a data entry of the data record based upon a preconfigured mapping between a type of data of the data entry mapped to the data category; and
      in response to detecting a new customer data requirement, update the one or more computer-form files associated with each data category according to each data record of each daily interval; and
   at a preconfigured time, generate the one or more computer-form files based upon each data category using each data record of each daily interval.

12. The system of claim 11, wherein the instructions cause the processor to detect the error data record of the plurality of data records based on a comparison of one or more data records of the plurality of data records against one or more data configurations associated with the computer-file forms.

13. The system of claim 12, wherein the one or more data configurations include one or more algorithms for generating the one or more computer-form files.

14. The system of claim 12, wherein the instructions further cause the processor to receive, by the computer, user input to modify at least one of the one or more data configurations.

15. The system of claim 11, wherein obtaining the corrected data record includes iteratively modifying error data records to correct errors until no errors remain.

16. The system of claim 11, wherein modifying the error data record to correct the error includes modifying the format of the data record according to a predefined exception management configuration.

17. The system of claim 11, wherein obtaining the corrected data record includes requesting user input to correct the error.

18. The system of claim 11, wherein obtaining the corrected data record includes requesting, from one or more databases of the plurality of databases, additional data records.

19. The system of claim 11, wherein the instructions cause the processor to detect the error data record of the plurality of data records based on a comparison of one or more data records of the plurality of data records against one or more data-exception configurations for corresponding one or more types of data in the plurality of data records.

20. The system of claim 11, wherein the instructions further cause the processor to detect the error based on the determined data category for the error data record.

* * * * *